(12) United States Patent
Jo et al.

(10) Patent No.: US 11,292,473 B1
(45) Date of Patent: Apr. 5, 2022

(54) SHIFT CONTROL METHOD FOR VEHICLE

(71) Applicants: Hyundai Motor Company, Seoul (KR); Kia Motors Corporation, Seoul (KR)

(72) Inventors: Se Hwan Jo, Bucheon-Si (KR); Bong Uk Bae, Daegu (KR); Min Jae Chai, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/152,580

(22) Filed: Jan. 19, 2021

(30) Foreign Application Priority Data

Sep. 16, 2020 (KR) .................. 10-2020-0119226

(51) Int. Cl.
*B60W 30/19* (2012.01)
*B60W 10/02* (2006.01)
(Continued)

(52) U.S. Cl.
CPC ............ *B60W 30/19* (2013.01); *B60W 10/02* (2013.01); *B60W 10/10* (2013.01); *F16D 25/14* (2013.01); *F16D 48/066* (2013.01); *F16H 61/0025* (2013.01); *F16H 61/2807* (2013.01); *B60W 2510/0241* (2013.01);
(Continued)

(58) Field of Classification Search
CPC ...... B60W 10/02; B60W 10/10; B60W 30/19; B60W 2510/0241; B60W 2510/107; B60W 2540/10; F16D 25/14; F16D 48/066; F16D 2121/04; F16D 2125/023; F16D 2500/1026; F16D 2500/1107; F16D 2500/3022; F16D 2500/30803; F16D 2500/3144; F16D 2500/70426; F16D 2500/70605; F16H 61/0025; F16H 61/2807; F16H 2061/0087
See application file for complete search history.

(56) References Cited

U.S. PATENT DOCUMENTS

2012/0141297 A1\* 6/2012 Jeong .................... B60W 20/00
417/5
2013/0297135 A1\* 11/2013 Yamanaka .............. B60L 50/16
701/22
(Continued)

FOREIGN PATENT DOCUMENTS

KR 10-2016-0005210 A 1/2016

*Primary Examiner* — Edwin A Young
(74) *Attorney, Agent, or Firm* — Morgan, Lewis & Bockius LLP (57) ABSTRACT

A shift control method of a transmission including an electric oil pump (EOP) directly connected to a friction clutch for a vehicle may include: when a shift is initiated, setting, by a controller, a predetermined first target RPM for controlling the EOP; determining, by the controller, a target current based on the first target RPM; maintaining, by the controller, the first target RPM until an EOP driving current reaches the target current; when the EOP driving current is greater than or equal to the target current, linearly reducing, by the controller, an RPM of the EOP from a predetermined second target RPM to a third target RPM; and increasing, by the controller, an EOP driving power to increase a friction force of the friction clutch such that a slip of the friction clutch is smaller than a predetermined reference slip.

11 Claims, 4 Drawing Sheets

(51) Int. Cl.
*F16H 61/00* (2006.01)
*F16H 61/28* (2006.01)
*F16D 48/02* (2006.01)
*F16D 48/06* (2006.01)
*B60W 10/10* (2012.01)
*F16D 121/04* (2012.01)
*F16D 125/02* (2012.01)

(52) U.S. Cl.
CPC ... *B60W 2510/107* (2013.01); *B60W 2540/10* (2013.01); *F16D 2121/04* (2013.01); *F16D 2125/023* (2013.01); *F16D 2500/1026* (2013.01); *F16D 2500/1107* (2013.01); *F16D 2500/3022* (2013.01); *F16D 2500/30803* (2013.01); *F16D 2500/3144* (2013.01); *F16D 2500/70426* (2013.01); *F16D 2500/70605* (2013.01); *F16H 2061/0087* (2013.01)

(56) References Cited

U.S. PATENT DOCUMENTS

2014/0109999 A1\* 4/2014 Meissner ............... F16D 25/14
137/565.11
2017/0284517 A1\* 10/2017 Rekow ............ B60W 30/18063

\* cited by examiner

SHIFT CONTROL METHOD FOR VEHICLE

CROSS REFERENCE TO RELATED APPLICATION

The present application claims priority to Korean Patent Application No. 10-2020-0119226, filed Sep. 16, 2020, the entire contents of which is incorporated herein for all purposes by this reference.

BACKGROUND OF THE INVENTION

Field of the Invention

The present invention relates to a shift control method for a vehicle.

Description of Related Art

Figure 1:
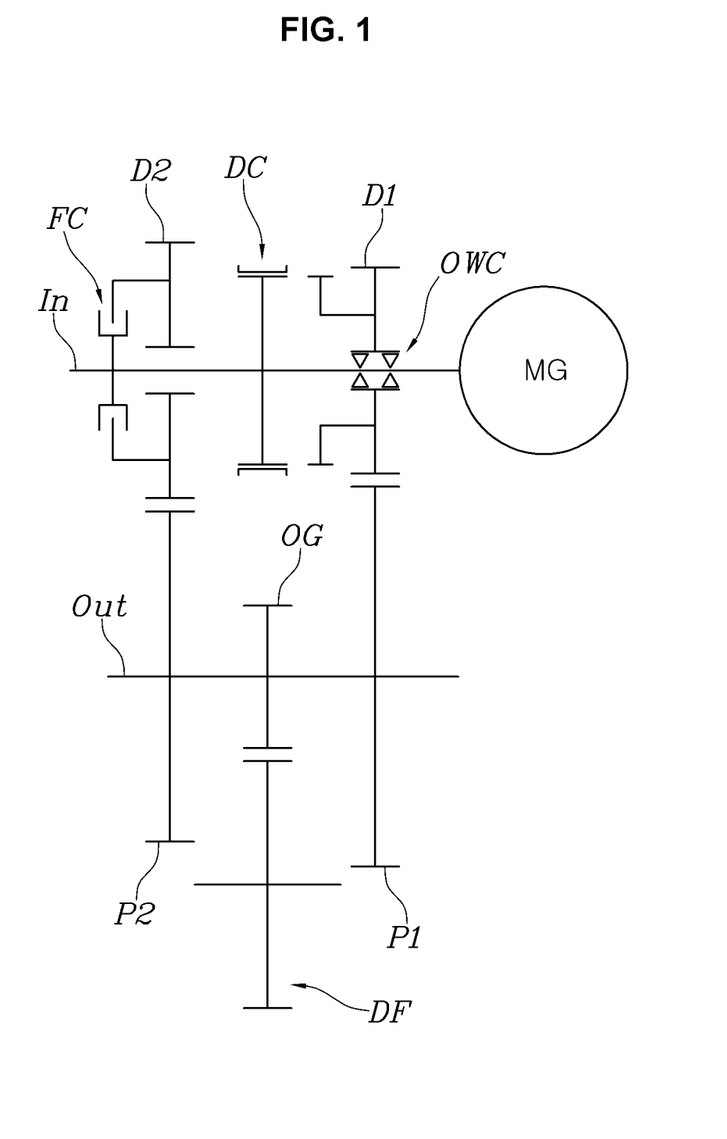
FIG. 1 is a view exemplarily illustrating a structure of a transmission for an electric vehicle to which various exemplary embodiments of the present invention is applicable.

FIG. 1 illustrates a configuration of a transmission for an electric vehicle to which the present invention is applicable.

An input shaft IN, which is rotated by power of a motor-generator MG, may drive a first-stage driving gear D1 through a one-way clutch OWC. A connected state of a second-stage driving gear D2 with respect to the input shaft IN may be changed through a friction clutch FC. An output shaft OUT is provided with a first-stage driven gear P1 engaged with the first-stage driving gear D1 and a second-stage driven gear P2 engaged with the second-stage driving gear D2, so that the power transmitted through the first-stage driven gear P1 or the second-stage driven gear P2 may be transmitted to a differential DF through an output gear OG.

The input shaft IN is provided with a dog clutch DC (or synchronizer) configured for implementing a reverse stage by reversely rotating the motor-generator MG while the first-stage driving gear D1 is fixed to the input shaft IN.

When the transmission having the above-described configuration performs a shifting from a first stage to a second stage, the shifting to the second stage is completed by merely engaging the friction clutch FC in a first-stage drive state.

That is, the shift from the first stage to the second stage is achieved by merely engaging one friction clutch FC.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a shift control method for a vehicle, on which a transmission performing a shift by engaging a friction clutch is mounted, to have a simpler configuration in controlling the friction clutch, so that required components for the transmission may be reduced and appropriate shifting performance may be secured, further improving the marketability of the vehicle ultimately.

According to various exemplary embodiments of the present invention, a shift control method of a transmission including an electric oil pump (EOP) directly connected to a friction clutch for a vehicle includes: when a shifting to be achieved by engaging the friction clutch is initiated, setting, by a controller, a predetermined first target RPM for controlling the EOP; determining, by the controller, a target current based on the first target RPM; maintaining, by the controller, the first target RPM until an EOP driving current, which is a current for driving the EOP, reaches the target current; when the EOP driving current is greater than or equal to the target current, linearly reducing, by the controller, an RPM of the EOP from a predetermined second target RPM to a third target RPM; and increasing, by the controller, an EOP driving power, which is a power for driving the EOP, to increase a friction force of the friction clutch such that a slip of the friction clutch is smaller than a predetermined reference slip.

The first target RPM may be set based on an auto transmission fluid (ATF) temperature and an accelerator position sensor (APS) signal, and the first target RPM may be set to be higher as the ATF temperature is higher or as the APS signal indicates a larger accelerator pedal-depressed amount.

The target current based on the first target RPM may be set to be an EOP driving current flowing when a piston starts moving as ATF is completely filled in a flow path from the EOP to the friction clutch when the EOP rotates at the first target RPM.

The controller may: set the third target RPM based on an ATF temperature; set a piston stroking time of the friction clutch based on an APS signal; and set the second target RPM using the third target RPM and the piston stroking time.

The third target RPM may be set to be higher as the ATF temperature is higher, and the piston stroking time may be set to be shorter as the APS signal indicates a larger accelerator pedal-depressed amount.

The controller may set the second target RPM to secure a flow rate of ATF filling a space generated by piston stroking when the RPM of the EOP is linearly changed from the second target RPM to the third target RPM during the piston stroking time.

In the increasing of the EOP driving power, the controller may increase the EOP driving power to follow a predetermined pressure profile selected based on an APS signal.

The pressure profile may be selected to have a higher level of pressure as the APS signal indicates a larger accelerator pedal-depressed amount.

After the increasing of the EOP driving power, when a slip of the friction clutch is greater than or equal to a predetermined reference slip, the shift control method may further include additionally increasing the EOP driving power until the slip of the friction clutch is smaller than the reference slip.

In the additionally increasing of the EOP driving power, the controller may learn the EOP driving power additionally increased until the slip of the friction clutch is smaller than the reference slip to reflect the additionally increased EOP driving power in the EOP driving power following the pressure profile at the time of next shift control.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
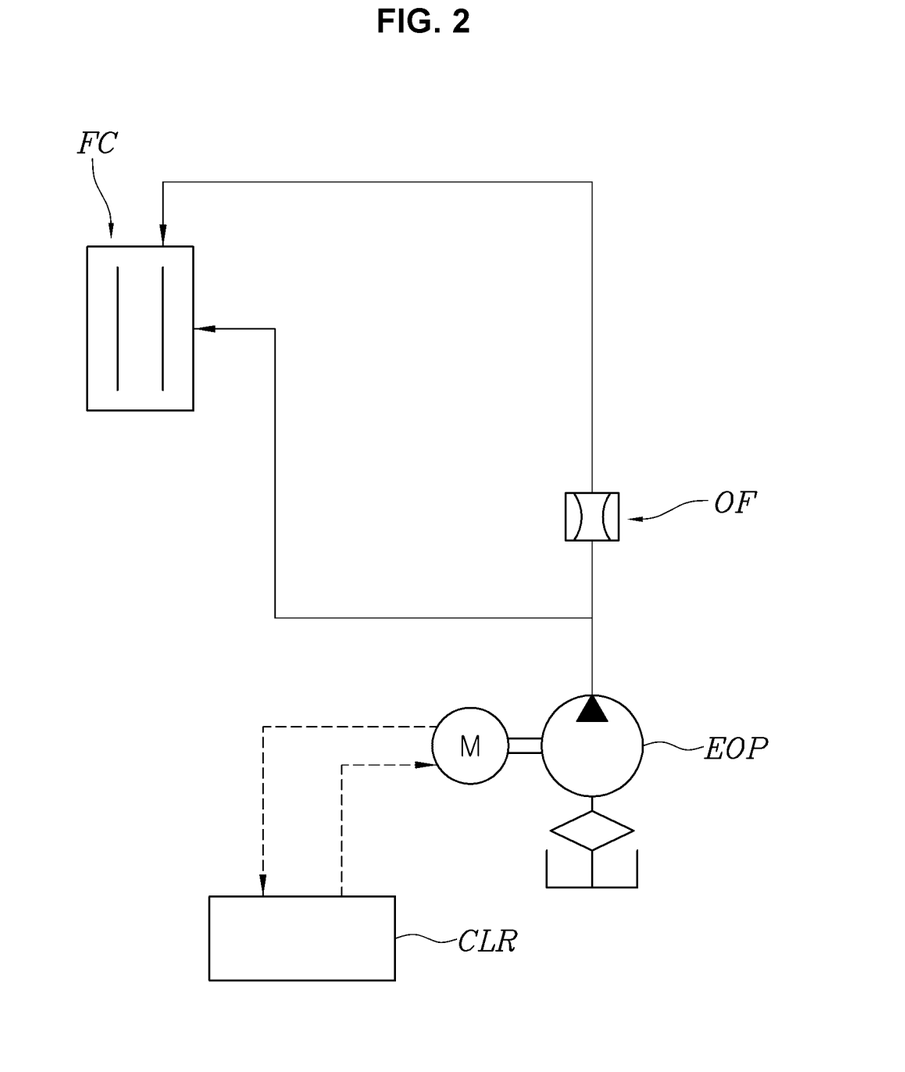
FIG. 2 is a view exemplarily illustrating a configuration of a hydraulic control apparatus controlling the transmission of FIG. 1 to which various exemplary embodiments of the present invention is applicable.

Referring to FIG. 1 and FIG. 2, a friction clutch FC of FIG. 1 is controlled by directly receiving a pressure of oil discharged from an electric oil pump (EOP), and a motor M of the EOP is controlled by a controller CLR.

Some of auto transmission fluid (ATF), which is oil discharged from the EOP, is used to lubricate and cool not only the friction clutch FC but also other gears through an orifice OF.

Figure 3:
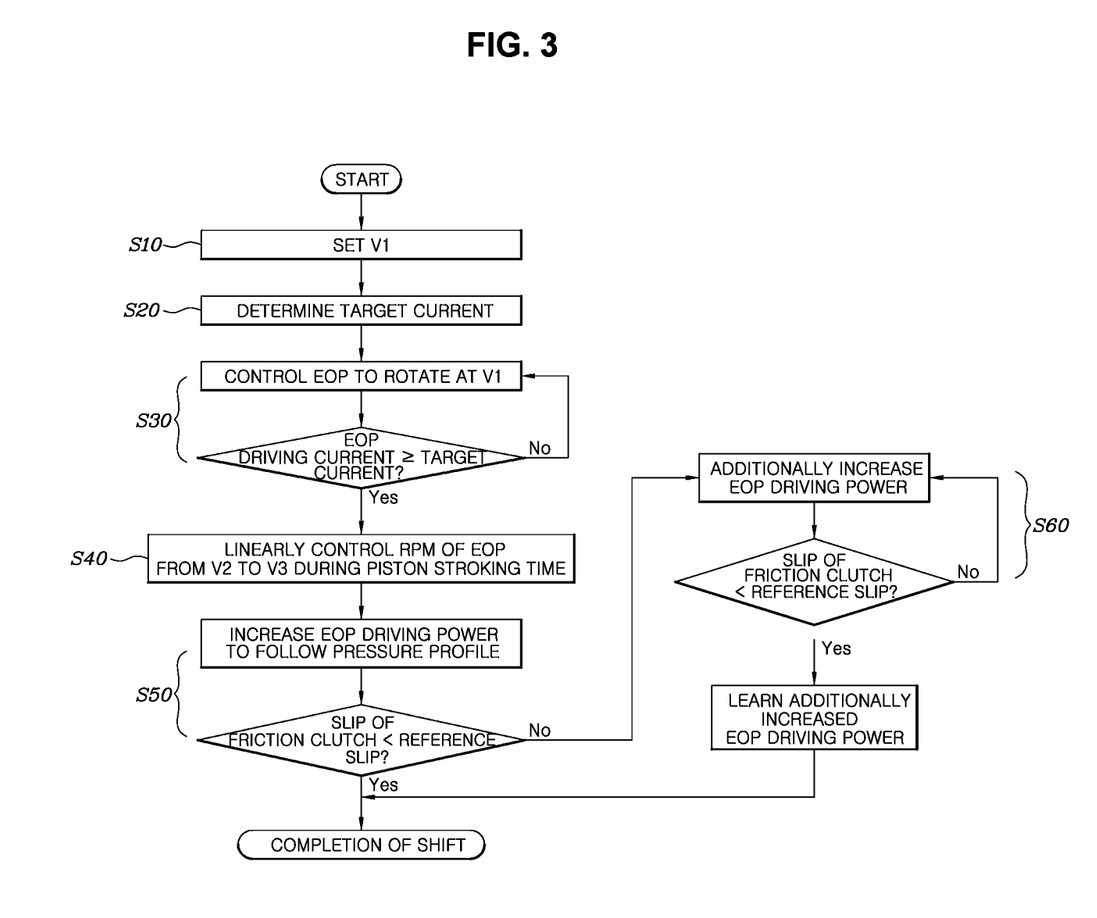
FIG. 3 is a flowchart illustrating a shift control method for a vehicle according to various exemplary embodiments of the present invention.

Referring to FIG. 3, a shift control method of a transmission including the EOP directly connected to the friction clutch FC for the vehicle according to various exemplary embodiments of the present invention includes: when a shifting to be achieved by engaging the friction clutch FC is initiated, setting, by the controller CLR, a predetermined first target RPM V1 for controlling the EOP (S10); determining, by the controller CLR, a target current based on the first target RPM V1 (S20); maintaining, by the controller CLR, the first target RPM V1 until an EOP driving current, which is a current for driving the EOP, reaches the target current (S30); when the EOP driving current is greater than or equal to the target current, linearly reducing, by the controller CLR, an RPM of the EOP from a predetermined second target RPM V2 to a third target RPM V3 (S40); and increasing, by the controller CLR, an EOP driving power, which is a power for driving the EOP, to increase a friction force of the friction clutch FC such that a slip of the friction clutch FC is smaller than a predetermined reference slip (S50).

That is, according to various exemplary embodiments of the present invention, it is possible to adjust a hydraulic pressure acting directly on the friction clutch FC by controlling the EOP, without requiring a separate solenoid valve or the like for controlling the hydraulic pressure. Accordingly, the number of parts may be reduced and the shifting operation may be smoothly performed.

Here, 'the EOP directly connected to the friction clutch' means that no separate solenoid valve or the like is provided in a flow path from the EOP to the friction clutch FC as illustrated in FIG. 2, so that the hydraulic pressure of the ATF discharged from the EOP may act directly on the friction clutch FC.

Furthermore, 'the shifting to be achieved by engaging the friction clutch' means that the shift is achieved by merely engaging one friction clutch, like a shifting from a first stage to a second stage achieved when the friction clutch FC is engaged as in the transmission illustrated in FIG. 1.

That is, in conventional transmissions each using a hydraulic pressure to perform a shift, the shift is performed by disengaging one clutch while engaging another clutch, which is a so-called clutch-to-clutch shift. In contrast, in a shifting situation to which various exemplary embodiments of the present invention is applied, the shift is achieved by merely engaging one friction clutch without disengaging another clutch.

The first target RPM V1 is set based on an ATF temperature and an accelerator position sensor (APS) signal; and the first target RPM V1 is set to be higher as the ATF temperature is higher or as the APS signal indicates a larger accelerator pedal-depressed amount.

This is because the ATF has a lower viscosity as the ATF temperature is higher, increasing an amount of leakage, and the driver is showing an intention to accelerate the vehicle faster as the APS signal indicates a larger accelerator pedal-depressed amount. Thus, the first target RPM V1 is set to be relatively higher for a faster shift.

The target current based on the first target RPM V1 is set to be an EOP driving current flowing when a piston starts moving as the ATF is completely filled in the flow path from the EOP to the friction clutch FC when the EOP rotates at the first target RPM V1.

When the shift is initiated, the controller CLR monitors the EOP driving current until reaching the target current, while controlling the EOP to rotate at the first target RPM V1. The EOP driving current having reached the target current indicates that the flow path from the EOP to the friction clutch FC is fully filled with the ATF and the piston of the friction clutch FC is now in such a condition as to start moving.

Figure 4:
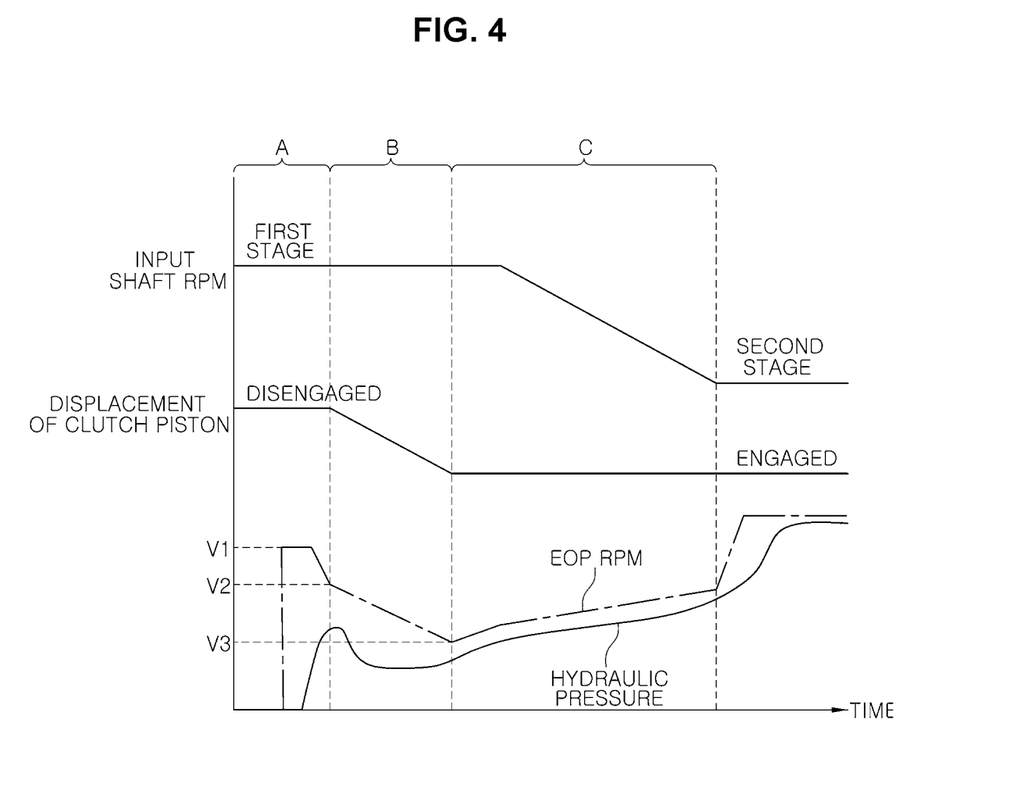
FIG. 4 is a graph for explaining the shift control method for a vehicle according to various exemplary embodiments of the present invention.

That is, the present process corresponds to Section A of FIG. 4, where the ATF is fully filled from the EOP to a pressure chamber, in which the piston of the friction clutch FC is located, to engage the friction clutch FC when the shift is initiated. As described above, when the EOP is continuously driven in a state where the controller CLR maintains the RPM of the EOP as the first target RPM V1, the pressure in the flow path increases and accordingly the EOP driving current increases, until the ATF discharged from the EOP is fully filled up to the pressure chamber and then the piston overcomes an elastic force of a return spring and starts moving. Using the present principle, it is determined that ATF is completely filled in the flow path from the EOP to the pressure chamber for the friction clutch FC.

According to various exemplary embodiments of the present invention, the friction clutch FC includes a plurality of clutch disks and clutch plates mounted between two rotators, which are power-regulated, to generate a frictional force between the two rotators when the clutch disks and the clutch plates are pressurized against each other. The clutch disks and the clutch plates are pressurized by the piston linearly sliding by the hydraulic pressure in the pressure chamber. In a state where no hydraulic pressure is provided to the pressure chamber, the return spring does not allow the piston to pressurize the clutch disks and the clutch plates, so that the power between the two rotators may be cut off.

When the EOP driving current is greater than the first target RPM V1 as the ATF is completely filled in the flow path from the EOP to the friction clutch FC and the piston becomes in such a condition as to start moving as described above, the controller CLR linearly reduces the RPM of the EOP from the second target RPM V2 to the third target RPM V3 (S40).

This process corresponds to Section B of FIG. 4, where the piston of the friction clutch FC has overcome the elastic force of the return spring and starts moving and the piston moves up to a position to start pressurizing the clutch disks and the clutch plates.

The movement of the piston as described above is called piston stroking. The RPM of the EOP when the piston starts generating the frictional force in the friction clutch FC by pressurizing the clutch disks and the clutch plates after completing the piston stroking corresponds to the third target RPM V3.

The controller CLR sets the third target RPM V3 based on the ATF temperature, sets a piston stroking time of the friction clutch FC based on the APS signal, and sets the second target RPM V2 using the third target RPM V3 and the piston stroking time.

The third target RPM V3 is set to be higher as the ATF temperature is higher, and the piston stroking time is set to be shorter as the APS signal indicates a larger accelerator pedal-depressed amount.

That is, the third target RPM V3 is set to be higher as the ATF temperature is higher, taking into account that the higher ATF temperature, the more leakage from a hydraulic circuit. Also, the piston stroking time is set to be shorter as the APS signal indicates a larger accelerator pedal-depressed amount, promoting a faster shift.

The controller CLR sets the second target RPM V2 to secure a flow rate of the ATF filling a space generated by the piston stroking when the RPM of the EOP is linearly changed from the second target RPM V2 to the third target RPM V3 during the piston stroking time.

That is, a volume of the space generated by the piston stroking, In other words, the space that needs to be filled with the ATF due to the piston stroking, is previously input to the controller CLR, by design, on the basis of a plurality of experiments and analysis thereof. Once the third target RPM V3 and the piston stroking time are determined, the controller CLR sets the second target RPM V2 to secure a flow rate for filling the volume during the piston stroking time.

Once the second target RPM V2 is set as described above, the controller CLR rapidly adjusts the RPM of the EOP from the first target RPM V1 to the second target RPM V2, and then gradually adjusts the RPM of the EOP from the second target RPM V2 to the third target RPM V3 to complete the piston stroking.

Thereafter, in the increasing of the EOP driving power (S50), the controller CLR increases the EOP driving power to follow a predetermined pressure profile selected based on the APS signal.

The pressure profile is a profile for increasing the frictional force of the friction clutch FC over time. A plurality of pressure profiles based on APS signals are previously input to a storage apparatus or the like, on the basis of a plurality of experiments and analysis thereof, to not only suppress an occurrence of shift shock but also promote a quick shift, so that the controller CLR may refer thereto to select a pressure profile to have a higher level of pressure as the APS signal indicates a larger accelerator pedal-depressed amount, engaging the friction clutch FC more rapidly to promote a quicker shift.

Here, the reason for adjusting the EOP driving power to follow the pressure profile is that the pressure exerted by the piston on the clutch disks and the clutch plates is determined depending on the EOP driving power.

This process corresponds to Section C of FIG. 4. In FIG. 4, it is illustrated that the RPM of the EOP is controlled in Section C as well in consideration of continuity with the other sections. Here, the RPM of the EOP obviously refers to an RPM for allowing the EOP driving power to follow the pressure profile.

When the EOP driving power is gradually increased to follow the selected pressure profile as described above, the friction clutch FC is engaged, so that a slip of the friction clutch FC may be smaller than the reference slip. When the slip of the friction clutch FC is smaller than the reference slip, the shift is substantially completed.

The reference slip, which is a value for determining that the shift has been completed as described above, may be determined, by design, on the basis of a plurality of experiments and analysis thereof.

However, when the slip of the friction clutch FC is greater than or equal to the reference slip even after increasing the EOP driving power, the EOP driving power is additionally increased until the slip of the friction clutch FC is smaller than the reference slip (S60) to reduce the slip of the friction clutch FC to be smaller than the reference slip such that the shift is terminated.

When the EOP driving power is additionally increased as described above, the controller CLR learns the EOP driving power additionally increased until the slip of the friction clutch FC is smaller than the reference slip to reflect the additionally increased EOP driving power in the EOP driving power following the pressure profile at the time of next shift control, facilitating a faster shift under the same conditions next time.

As described above, according to various exemplary embodiments of the present invention, it is possible to form a hydraulic pressure required for engaging the friction clutch FC that performs a shift, by directly controlling the EOP, without requiring a separate solenoid valve or the like for adjusting the hydraulic pressure. Accordingly, the number of required parts may be reduced, not only improving the assembling efficiency and promoting a reduction in cost but also implementing a smooth and stable shifting operation, which greatly contributes to an improvement of the marketability of the vehicle.

According to various exemplary embodiments of the present invention, the vehicle on which the transmission performing a shift by engaging the friction clutch is mounted may have a simpler configuration in controlling the friction clutch, so that required components for the transmission may be reduced and appropriate shifting performance may be secured, further improving the marketability of the vehicle ultimately.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A shift control method of a transmission including an electric oil pump (EOP) directly connected to a friction clutch for a vehicle, the shift control method comprising:
   upon determining that a shifting to be achieved by engaging the friction clutch is initiated, setting, by a controller, a first target revolutions per minute (RPM) for controlling the EOP;
   determining, by the controller, a target current according to the first target RPM;
   maintaining, by the controller, the first target RPM until an EOP driving current, which is a current for driving the EOP, reaches the target current;
   upon determining that the EOP driving current is greater than or equal to the target current, linearly reducing, by the controller, an RPM of the EOP from a second target RPM to a third target RPM; and
   increasing, by the controller, an EOP driving power, which is a power for driving the EOP, to increase a friction force of the friction clutch so that a slip of the friction clutch is smaller than a predetermined reference slip.

2. The shift control method of claim 1,
   wherein the first target RPM is set according to an auto transmission fluid (ATF) temperature and an accelerator position sensor (APS) signal, and
   wherein the first target RPM is set to be higher as the ATF temperature is higher or as the APS signal indicates a larger accelerator pedal-depressed amount.

3. The shift control method of claim 1, wherein the target current according to the first target RPM is set to be an EOP driving current flowing upon determining that a piston starts moving as ATF is completely filled in a flow path from the EOP to the friction clutch when the EOP rotates at the first target RPM.

4. The shift control method of claim 1, wherein the controller is configured:
   to set the third target RPM according to an ATF temperature;
   to set a piston stroking time of the friction clutch according to an APS signal; and
   to set the second target RPM using the third target RPM and the piston stroking time.

5. The shift control method of claim 4,
   wherein the third target RPM is set to be higher as the ATF temperature is higher, and
   wherein the piston stroking time is set to be shorter as the APS signal indicates a larger accelerator pedal-depressed amount.

6. The shift control method of claim 4, wherein the controller is configured to set the second target RPM to secure a flow rate of ATF filling a space generated by piston stroking upon determining that the RPM of the EOP is linearly changed from the second target RPM to the third target RPM during the piston stroking time.

7. The shift control method of claim 1, wherein in the increasing of the EOP driving power, the controller is configured to increase the EOP driving power to follow a predetermined pressure profile selected according to an APS signal.

8. The shift control method of claim 7, wherein the pressure profile is selected to have a higher level of pressure as the APS signal indicates a larger accelerator pedal-depressed amount.

9. The shift control method of claim 1,
wherein the increasing of the EOP driving power includes, upon determining that the slip of the friction clutch is greater than or equal to the predetermined reference slip after an initial increase of the EOP driving power, additionally increasing the EOP driving power until the slip of the friction clutch is smaller than the predetermined reference slip.

10. The shift control method of claim 9, wherein in the additionally increasing of the EOP driving power, the controller is configured to learn the EOP driving power additionally increased until the slip of the friction clutch is smaller than the predetermined reference slip to reflect the additionally increased EOP driving power in the EOP driving power following a pressure profile at a time of next shift control.

11. The shift control method of claim 1, wherein the controller includes:
a processor; and
a non-transitory storage medium on which a program for performing the shift control method of claim 1 is recorded and executed by the processor.

\* \* \* \* \*